(12) United States Patent
St. Amant et al.

(10) Patent No.: US 8,801,843 B1
(45) Date of Patent: Aug. 12, 2014

(54) SYSTEM FOR REMOVING VAPORS FROM A LIQUID TANK AS THE LIQUID TANK IS FILLED WITH FLUID FROM A FLUID SOURCE

(75) Inventors: Jefferey St. Amant, League City, TX (US); Kenneth R. Matheson, Corpus Christi, TX (US); Keith Nathan, Seabrook, TX (US)

(73) Assignee: Vapor Point, LLC, La Porte, TX (US)

( * ) Notice: Subject to any disclaimer, the term of this patent is extended or adjusted under 35 U.S.C. 154(b) by 531 days.

(21) Appl. No.: 13/191,803

(22) Filed: Jul. 27, 2011

Related U.S. Application Data

(63) Continuation-in-part of application No. 12/365,567, filed on Feb. 4, 2009, now abandoned.

(60) Provisional application No. 61/063,901, filed on Feb. 6, 2008, provisional application No. 61/065,720, filed on Feb. 14, 2008.

(51) Int. Cl.
*B01D 47/02* (2006.01)

(52) U.S. Cl.
USPC .................................. 96/352; 96/354; 95/226

(58) Field of Classification Search
None
See application file for complete search history.

(56) References Cited

U.S. PATENT DOCUMENTS

| 5,122,165 A | 6/1992 | Wang et al. |
|---|---|---|
| 7,147,689 B1 * | 12/2006 | Miller .............................. 95/92 |
| 2011/0067994 A1 | 3/2011 | Moorhead et al. |

* cited by examiner

*Primary Examiner* — Duane Smith
*Assistant Examiner* — Pankti Patel
(74) *Attorney, Agent, or Firm* — Buskop Law Group, PC; Wendy Buskop

(57) ABSTRACT

A system for removing unwanted contaminates from gases using a scrubber, which comprises a housing, a reaction chamber having a liquid level, an inlet connected to a source containing gases to be scrubbed with a contamination concentration greater than zero ppb to saturation. A gas exit port connected to the housing is used for evacuating scrubbed gas and a sintered permeable membrane is disposed across the reaction chamber, which provides a reaction zone in the plurality of pores when gases to be scrubbed are introduced to the membrane on a first side while the membrane is immersed in the lean liquid; and a cleaned gas on a second side wherein the clean gas initially has a drop in contamination concentration of at least 99 percent and gradually decreasing to 70 percent as additional gases to be scrubbed are introduced to the plurality of pores without replacing the lean liquid.

19 Claims, 13 Drawing Sheets

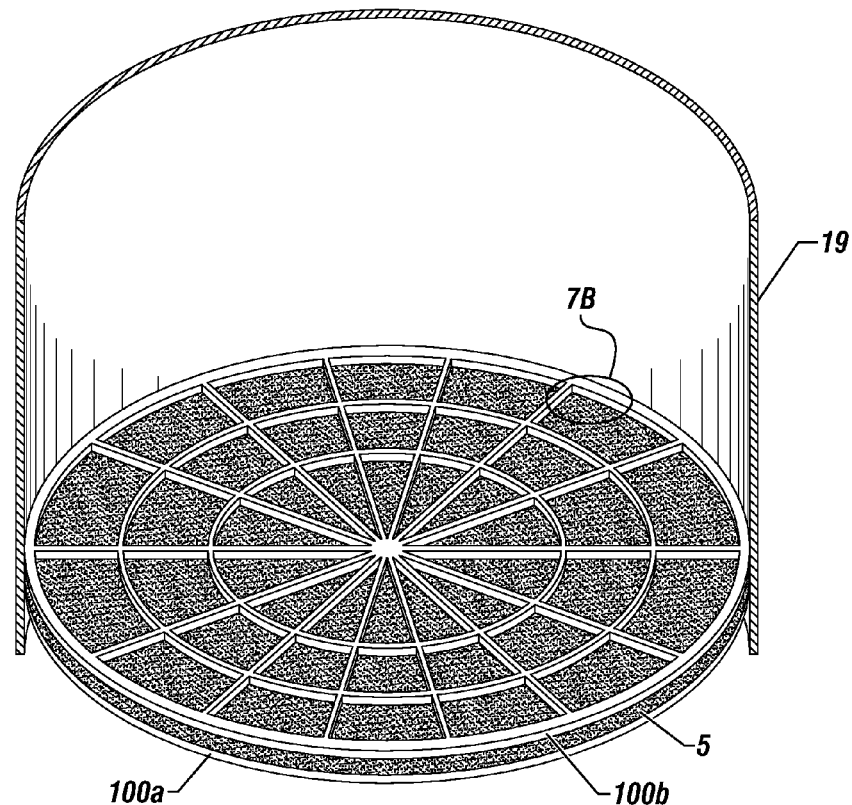
FIGURE 7A
FIGURE 7B
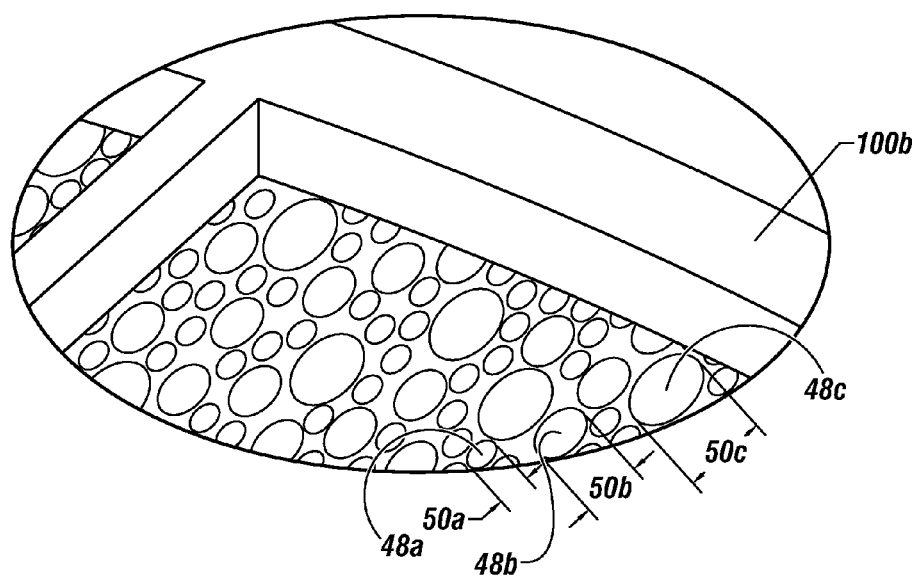

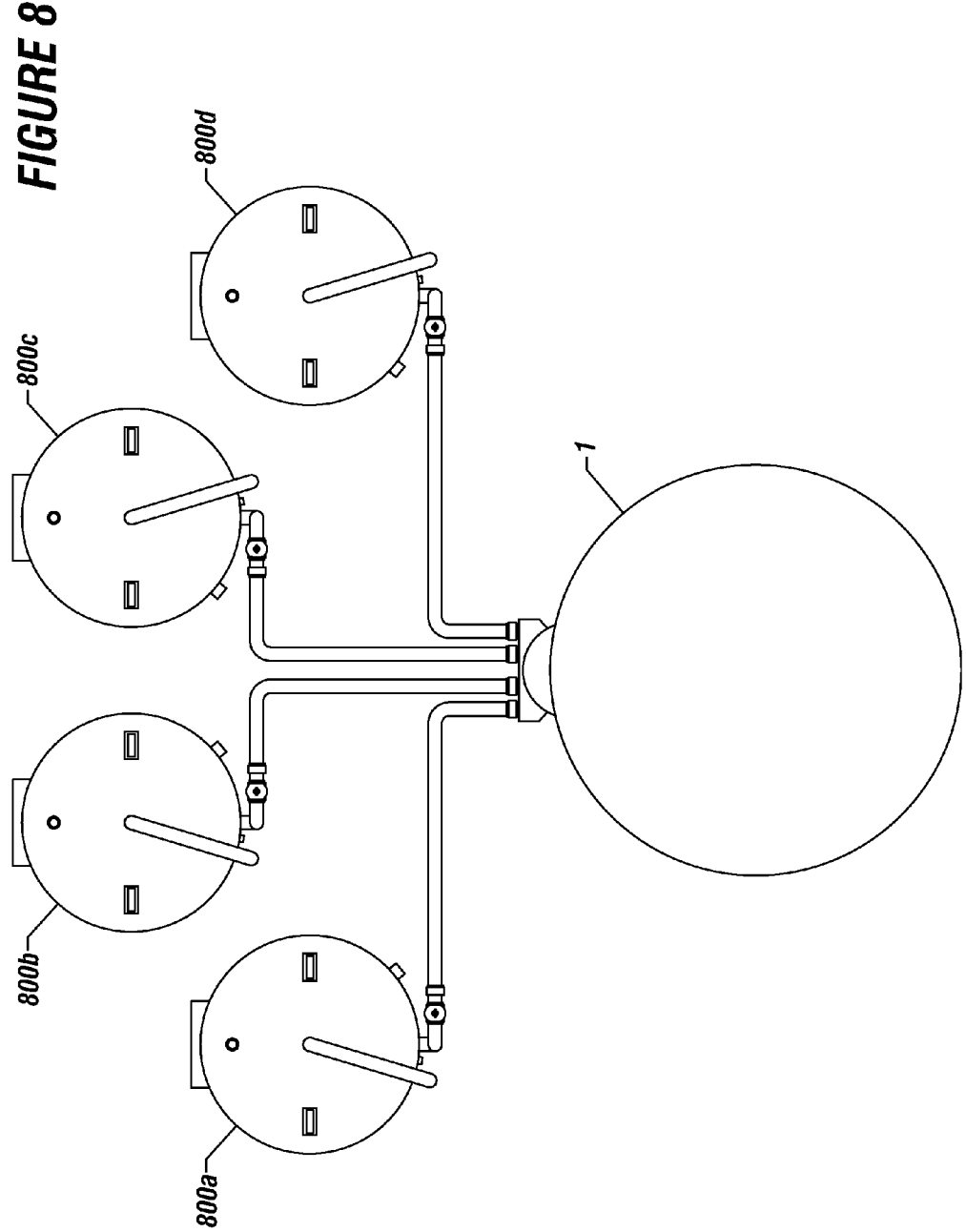

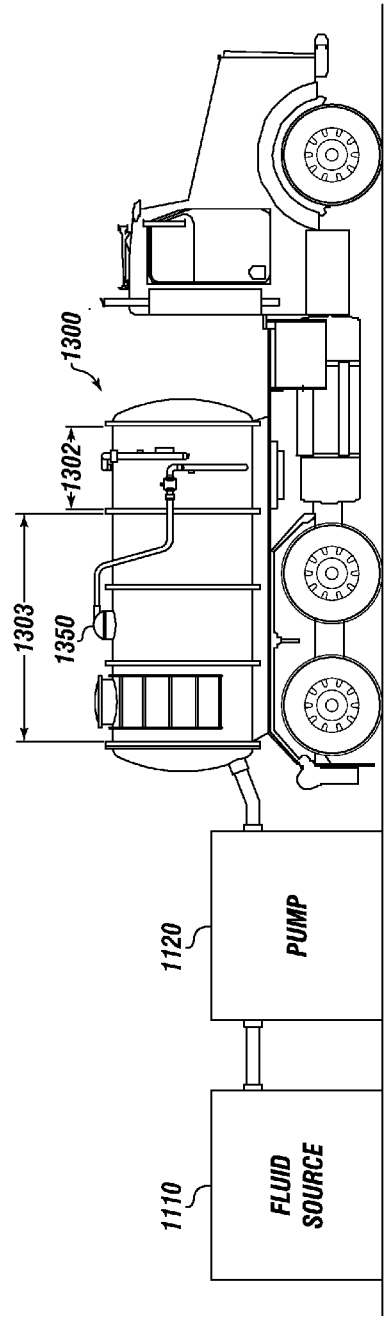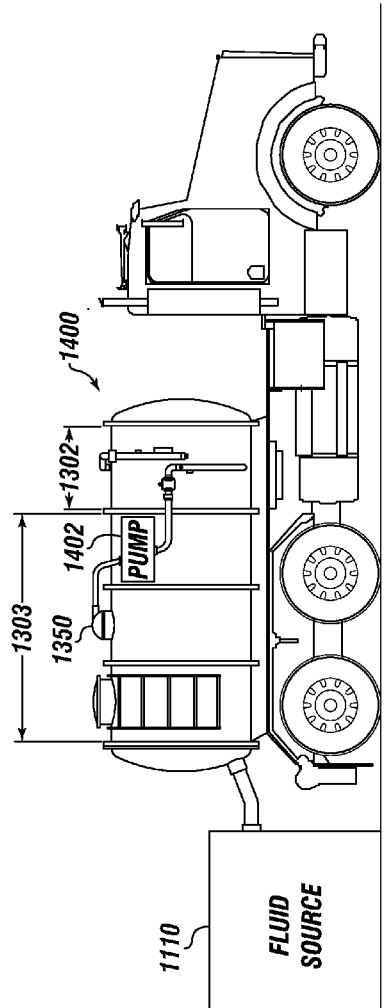

SYSTEM FOR REMOVING VAPORS FROM A LIQUID TANK AS THE LIQUID TANK IS FILLED WITH FLUID FROM A FLUID SOURCE

CROSS REFERENCE TO RELATED APPLICATIONS

The present application is a Continuation in Part of U.S. application Ser. No. 12/365,567 filed on Feb. 4, 2009, entitled "SYSTEM FOR REMOVING UNWANTED CONTAMINATES FROM GASES," which claims priority to and the benefit of U.S. Provisional Application Ser. No. 61/063,901 filed on Feb. 6, 2008, entitled "Gas/liquid contact device" and U.S. Provisional Application Ser. No. 61/065,720 filed on Feb. 14, 2008, entitled "Gas/liquid contact device;". These references are incorporated herein in their entirety.

FIELD

The present embodiments generally relate to a system for removing vapors from a liquid tank as the liquid tank is filled with fluid from a fluid source.

BACKGROUND

A need exists for a system for removing vapors from a liquid tank as the liquid tank is filled with fluid from a fluid source with up to about 100 percent efficiency.

A further need exists for a system for removing vapors from a liquid tank as the liquid tank is filled with fluid from a fluid source that does not require utilities and does not generate heat.

A further need exists for a system for removing vapors from a liquid tank as the liquid tank is filled with fluid from a fluid source that is low pressure to operate, which is safer than other scrubbers that operate at high pressures.

The present embodiments meet these needs.

BRIEF DESCRIPTION OF THE DRAWINGS

The detailed description will be better understood in conjunction with the accompanying drawings as follows:

FIG. 7 is a cut view of the housing showing the sintered permeable membrane.

FIG. 8 shows four scrubbers connected in parallel according to an embodiment of the invention.

FIG. 13 depicts a system utilizing a housing having a liquid tank portion and a scrubber portion.

FIG. 14 depicts another embodiment of another system for removing vapors from a liquid tank as the liquid tank is filled with fluid from a fluid source.

Figure 1:
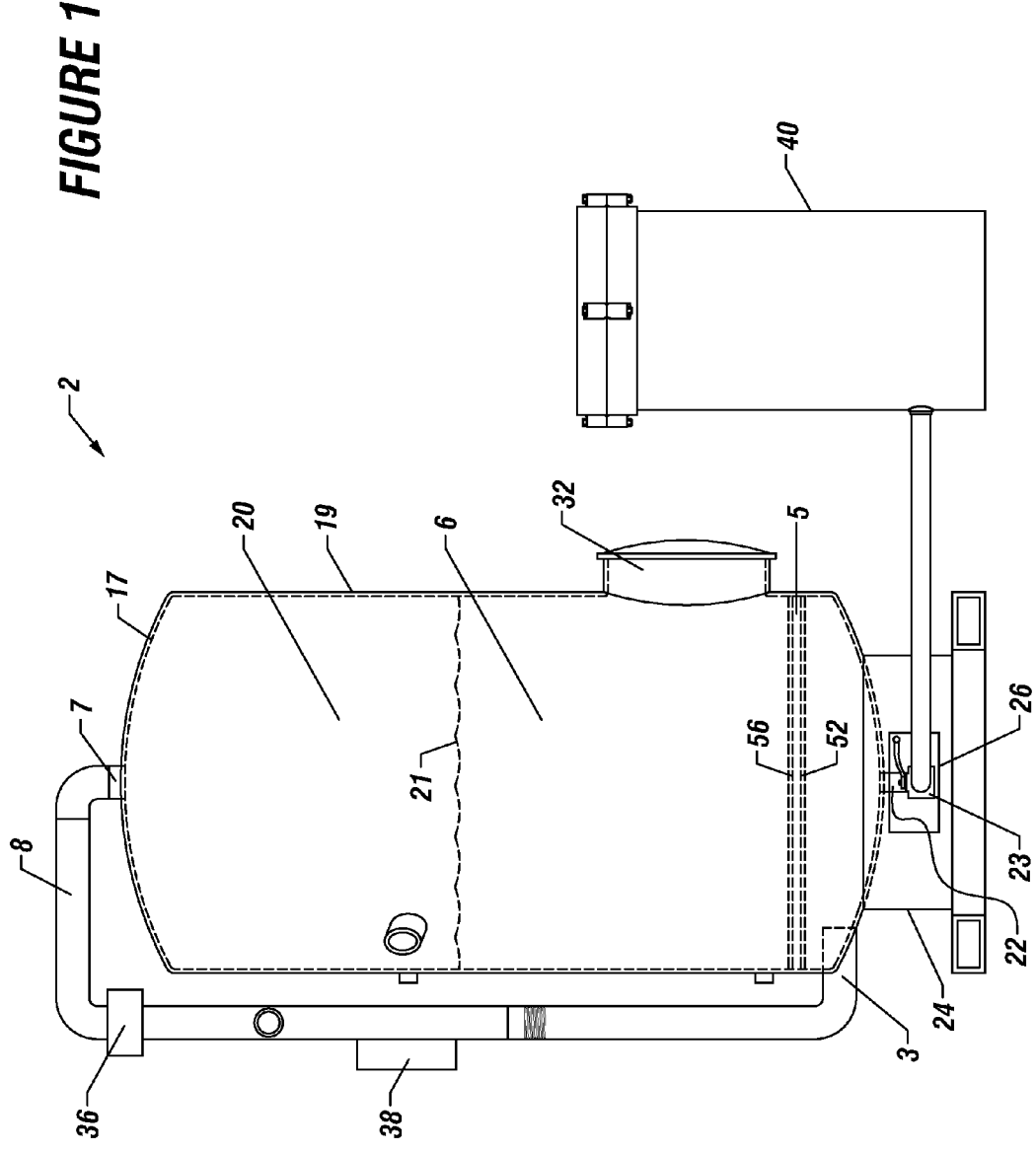
FIG. 1 is schematic drawing of the overall system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The system for removing vapors from a liquid tank as the liquid tank is filled with fluid from a fluid source can include a transport vehicle. The transport vehicle can be a barge, a trailer, a barge with a trailer disposed on the barge, a truck, a ship, a rail car with a trailer disposed thereon, a skid, or combinations thereof. A liquid tank can be connected with the transport vehicle. For example, the liquid tank can be secured to a trailer connected with the transport vehicle, a portion of the transport vehicle, or otherwise connected with the transport vehicle. The liquid tank can have a vent formed through a portion thereof.

The fluid source can be a above ground storage tank, a below ground storage tank, or other fluid source.

The vent of the liquid tank can be in fluid communication with a scrubber. The scrubber can have a housing. The housing can include a lean liquid. The scrubber can include a sintered permeable membrane disposed in a reaction zone within the housing. The sintered permeable membrane can be configured to contact vapor from the liquid tank that has been in prior contact with the lean liquid in a portion of the reaction chamber, and can provide an interface for enhanced contact of the gases to be scrubbed and the lean liquid.

In one or more embodiments, a vacuum pump can be connected with the vent of the liquid tank. The vacuum pump can have an exhaust that is connected with the scrubber.

In one or more embodiments, the scrubber can include a housing that has a removable portion, and the permeable membrane can be integrated with a cartridge that is connected to the removable portion of the housing. Accordingly, the permeable membrane can be removed from the housing and maintenance can be performed on the permeable membrane. This allows for safe and efficient upkeep of the scrubber.

The scrubber can be configured to be disposed on a transport device. Illustrative transport devices can include a skid, a trailer, a pallet, or combinations thereof. In another embodiment, the scrubber can be mounted on the transport vehicle.

In one or more embodiments, the scrubber and the liquid tank can be disposed on a single transport device, on the transport vehicle, or combinations thereof.

In one or more embodiments, a plurality of scrubbers can be in fluid communication with one or more vents of the liquid tank.

In one or more embodiments, the system can include a housing that is a bifurcated housing having a liquid tank portion and a scrubber portion.

The liquid tank portion can have a vent in fluid communication with the scrubber portion. The scrubber portion can be substantially similar to one or more scrubbers described herein.

In one or more embodiments, a plurality of housings can be connected with the transport vehicle.

One or more described embodiments of the system can be used to perform a method for removing vapor from a liquid tank as the liquid tank is being filled with a fluid from a fluid source.

The method can include providing a liquid to a liquid tank disposed on a transport vehicle, wherein the liquid forms a vapor as the liquid tank is filled.

The method can also include transferring vapor within the liquid tank to a mobile scrubber via a vent of the liquid tank.

Turning now to the Figures, FIG. 1 shows a scrubber 2 with a housing 19 on a pedestal 24. Inside the housing 19 can be a reaction chamber 20 with a drain port 22. The drain port 22 can flow to a collection tank 40.

The drain port 22 can be a sump and a drain tube, or a siphon tube can extend into the drain port to remove any liquid in the reaction zone using a pump. The sump and drain tube embodiment can be particularly useful with roll off container embodiments of the scrubber when hazardous materials are used.

The drain port 22 can have a drain valve 23, such as a ball valve, a gate valve or a butterfly valve, such as those made by Fisher of Stockham, which can control the flow from the drain port 22 to the collection tank 40.

In an embodiment, the pedestal 24, for supporting the scrubber 2, can have a pedestal access port 26.

A manway 32 can be formed in the housing 19. The manway 32 can provide access to the inside of the housing 19, allowing personal to clean and maintain the reaction chamber 20 or to replace the permeable membrane.

The reaction chamber 20 can also have a gas exit port 7. The gas exit port 7 can be from about 3 inches to about 24 inches in diameter and can be used to evacuate scrubbed gas, which is shown in detail in FIG. 6, that has been processed with the scrubber 2.

An exit conduit 8 can be connected to the gas exit port 7 for allowing the scrubbed gas to vent to the atmosphere or to another container.

A knock out canister 36, such as those custom made by Proco of Kingsville, Tex., can serve to knock out, remove, or capture any of the liquid that can be entrained in the scrubbed gas. The knock out canister 36 can be located between a vent 38 and the exit conduit 8.

The reaction chamber 20 can be filled with a lean liquid 6 creating a liquid level 21. During scrubbing the lean liquid 6 can move up and down in the reaction chamber 20 providing variable liquid levels 21 with the lean liquid 6 herein.

The lean liquid can be a liquid adsorbent, a liquid solubilizer, a liquid absorbent, a liquid reacting agent or combinations thereof. Examples of lean liquid can include hydraulic oil such as a 10 weight hydraulic fluid, refined diesel fuel, fatty acids such as tall oil, amine solutions, methyl esters, animal fats, combination of an acid leached bentonite and a modified aminoplast resign and a solid hydrophobic material, tannins, oils from animals such as emu oil, biologically derived fluids including palm oil, plant oils. Liquid reacting agents such as acetic acid, phosphoric acid, caustic solutions of sodium hydroxide, water, caustic solutions of potassium hydroxide can be used. The lean liquid may include surfactants such as detergents including, but not limited to, polyethoxylated tallow amine, ethoxylated fatty amines, alkylphenol ethoxylate-based surfactants, alcohol ethoxylate-based surfactants, organosilicones, alcohol ether sulfate, sodium alkyl propoxylated.

The housing can include an interior liner 17. The liner can line the inside of the entire housing. The liner can be film, a thermoplastic or composite coating, a phenolic resin coating, an epoxy paint, a rubber or combinations thereof.

Figure 2:
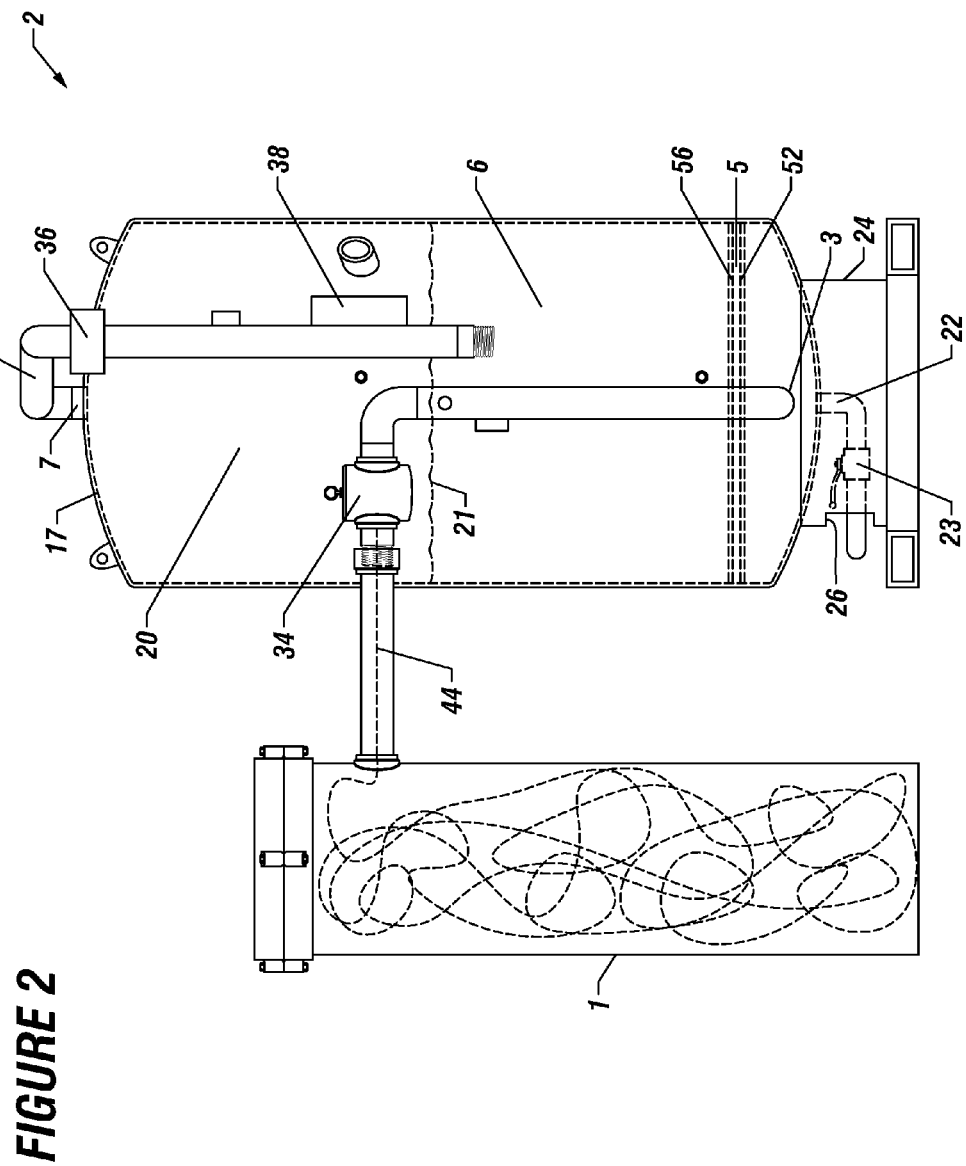
FIG. 2 is an alternative view of the overall system.

The housing 19 can also have an inlet 3. The inlet 3 can be connected to a source, which is shown in FIG. 2, that contains the gases to be scrubbed.

The inlet 3 can be below the liquid level 21 in the reaction chamber 20.

In one or more embodiments, the gas exit port 7 port can have an identical diameter to the inlet 3. In one or more embodiments, the gas exit port 7 can have a diameter at least equal to the inlet 3.

The inlet 3 can be about a 3 inch to about 24 inch diameter inlet with flow rates that can range from about 1 cubic feet per minute to about 20,000 cubic feet per minute.

In an embodiment, the inlet 3 can be positioned in the housing 19 to insure that the gases to be scrubbed are introduced to the lean liquid 6 initially.

The sintered permeable membrane 5 can have a first side 52 and a second side 56. The sintered permeable membrane 5 can be disposed across the reaction chamber 20.

FIG. 2 depicts an alternate embodiment of the scrubber 2 connected to a source 1 of gases to be scrubbed 44.

In FIG. 2, an inlet check valve 34 is shown positioned between the source 1 of gases to be scrubbed 44 and the inlet 3 of the scrubber 2. The inlet check valve 34 can be used to control the flow of gases to be scrubbed 44 through the inlet 3. The inlet check valve can be a low pressure valve, such as from about 1 psi to about 100 psi. The inlet check valve can be a swinging check valve. A feature of the embodiments is that the inlet pressure can be low, making this scrubber safer than high pressure scrubbers.

Figure 3:
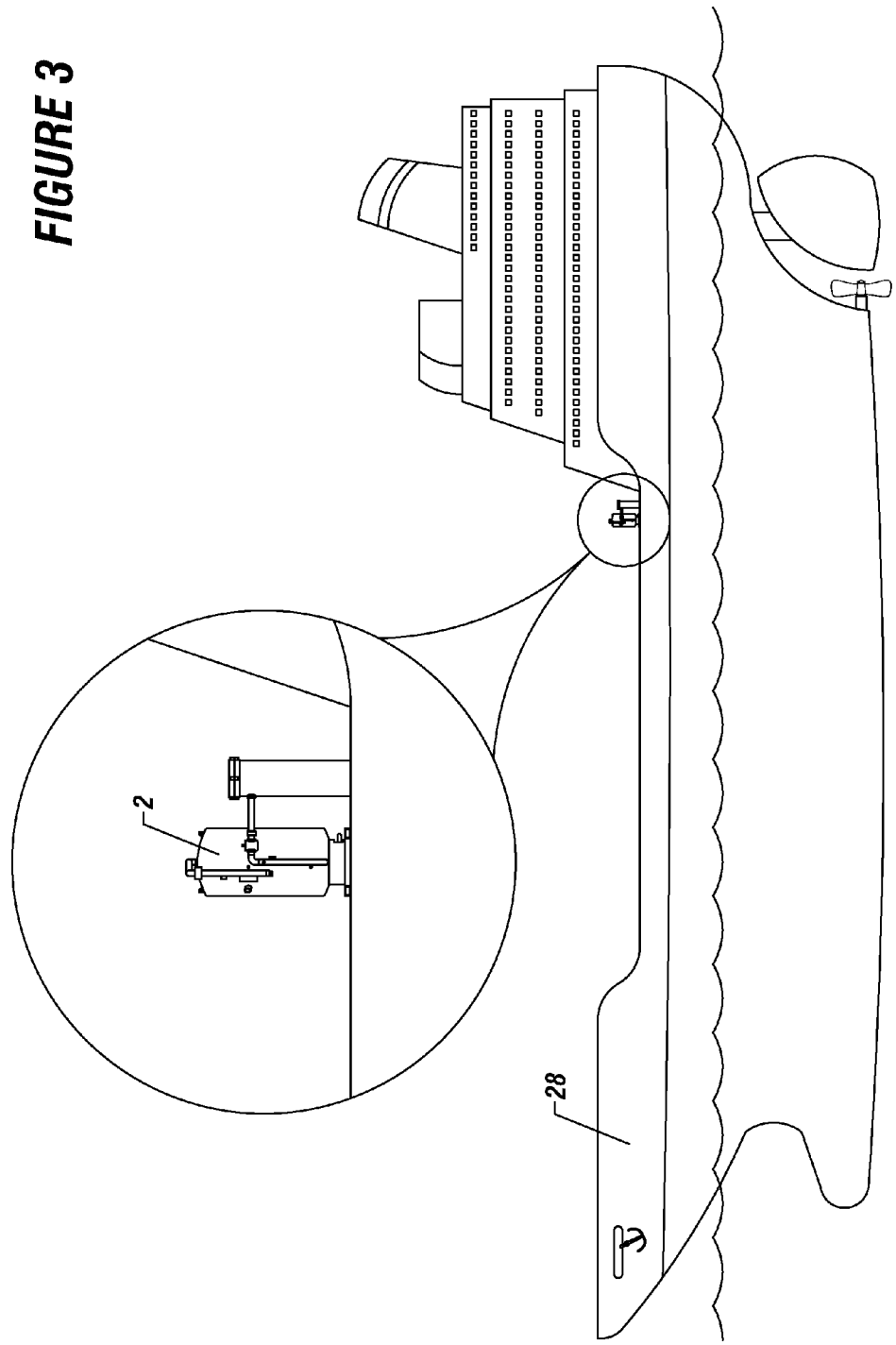
FIG. 3 is an embodiment of the invention on a ship.

FIG. 3 shows an embodiment of the invention on a moveable transport vehicle 28, which can be a floating vessel, with a scrubber 2 disposed thereon.

Figure 4:
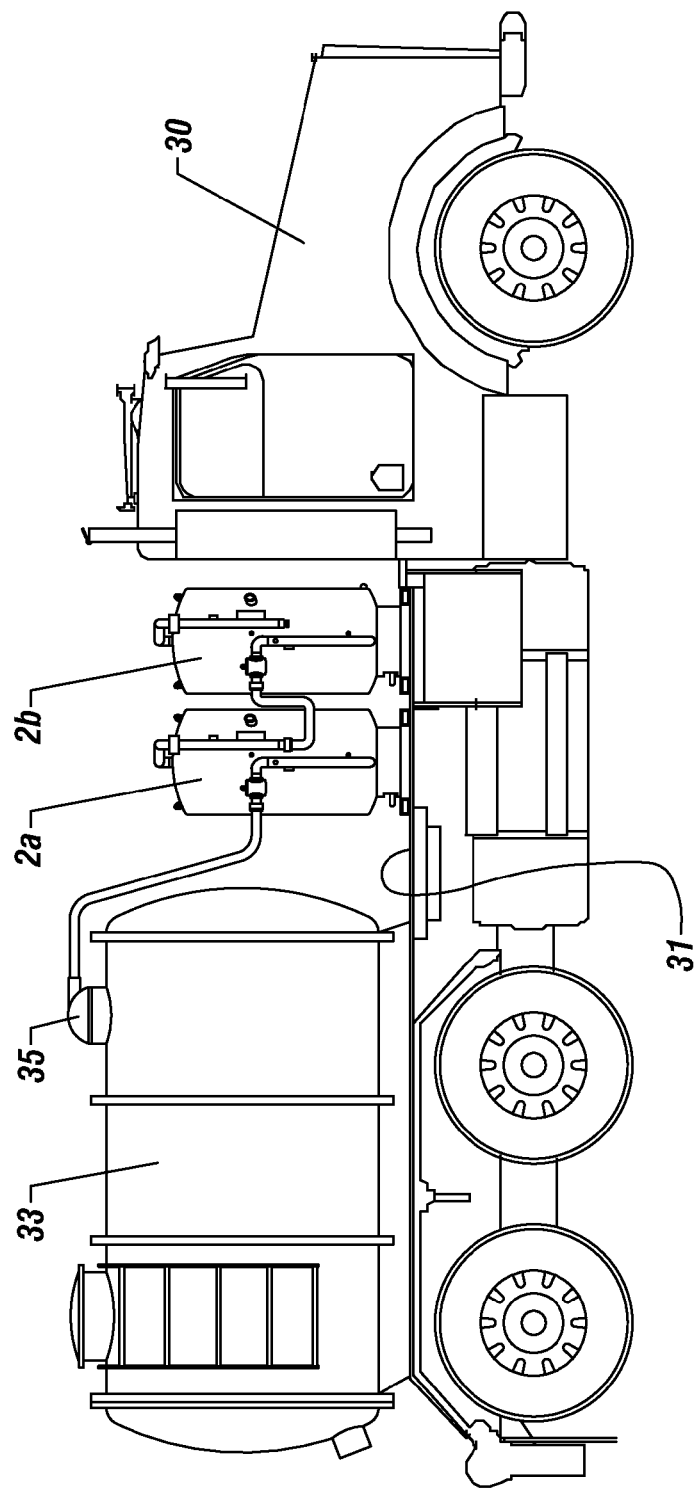
FIG. 4 is an embodiment of the invention on a vacuum truck.

FIG. 4 shows an embodiment of a plurality of scrubbers connected in series on a transport vehicle, which is depicted as a truck 30 in this embodiment. This embodiment shows that a first scrubber 2a can connect to a second scrubber 2b and additional scrubbers can be added to provide versatility in capacity of scrubbing gases, such as during a start up from a turn around at a chemical plant, when excess capability might be needed for a short time, but not for a long term solution. The modularity of the scrubbers, the ability to mix and match scrubber sizes to a need of a user provides a unique advantage to this invention. Additionally, if a gas stream needs to be "multiprocessed" that is treated to the same lean liquid repeatedly, the scrubbers connected in series enable this operation style.

The truck 30 can have a bed 31. A vacuum pump 33 can be disposed on the truck 30. The vacuum pump 33 can have a vacuum pump exhaust 35. The scrubbers 2a and 2b can be connected with the vacuum pump exhaust 35.

Figure 5:
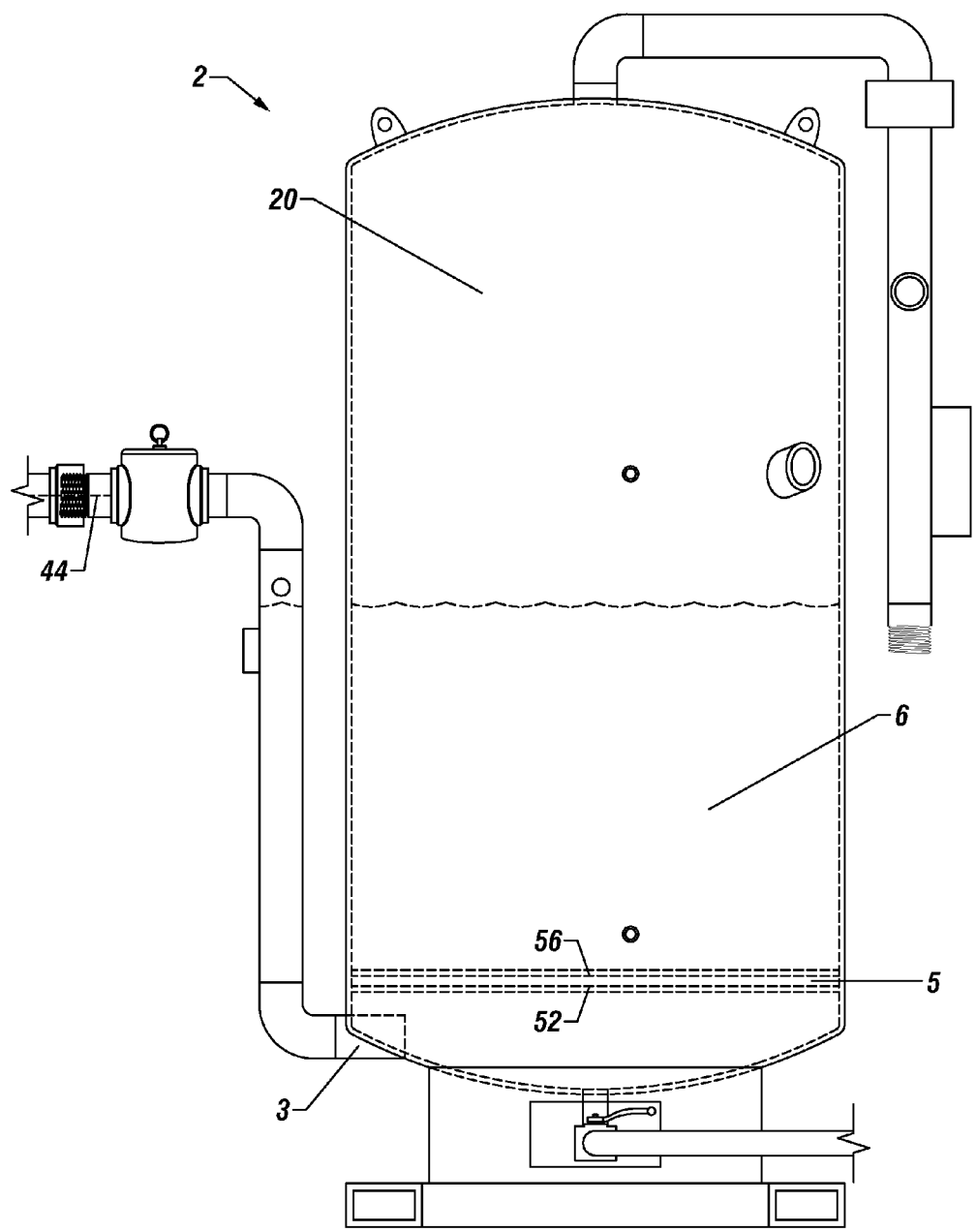
FIG. 5 depicts the system prior to the introduction of gases to be scrubbed to the scrubber.

FIG. 5, shows scrubber 2 with lean liquid 6 prior to introducing gases to be scrubbed 44 through the inlet 3. The lean liquid 6 is shown filling the reaction chamber 20 on both the first side 52 and second side 56 of the sintered permeable membrane 5.

Figure 6:
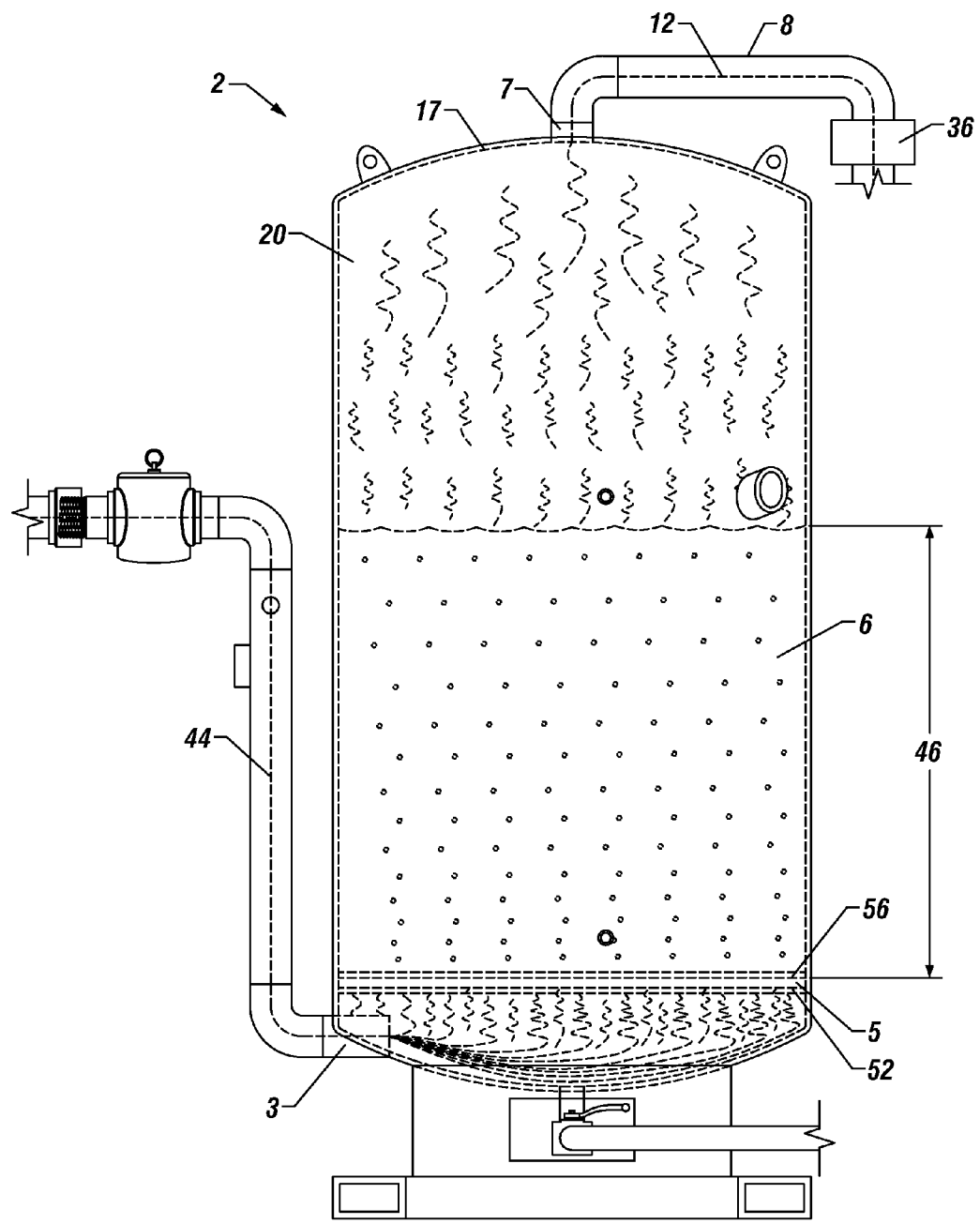
FIG. 6 shows the system after gases to be scrubbed have been introduced to the system.

FIG. 6 depicts the scrubber 2 with lean liquid 6 having moved through the sintered permeable membrane 5. The gases to be scrubbed 44 are shown flowing from the inlet 3 into the reaction chamber 20. The gases to be scrubbed 44 can then pass through the sintered permeable membrane 5, which can form the reaction zone 46.

The gases to be scrubbed 44 can have a contamination concentration greater than 0 ppb to saturation, such as in the range of about 20 ppm to about 250 ppm.

The gases to be scrubbed 44 can be gases with contaminates that are volatile organic compounds, hazardous air pollutants, hydrogen sulfides, ammonia, sulfur dioxide and combinations thereof. The amounts to be scrubbed for refineries for certain streams have different percentages than for a chemical plant, and the amounts to be cleaned depend on the location of the plant having the gases to be scrubbed.

For example, in Corpus Christi, Tex., a gas to be scrubbed can be a stream of gas with more than about 5 ppm benzene as of Jan. 29, 2009.

The gases to be scrubbed can be anticipated to be gases that exceed federal Environmental Protection Agency "EPA", Title 40 regulations as of Jan. 1, 2009 and Texas Commission on Environmental Quality Title 30 regulations regulatory levels as of Jan. 1, 2009.

The sintered permeable membrane 5 can have lean liquid 6 adjacent or covering the first side 52 and the second side 56. The inlet 3 can be in fluid communication with the first side 52.

Cleaned gases, which are identified herein as scrubbed gas 12, can flow past the second side 56 of the sintered permeable membrane 5. The scrubbed gas 12 has a drop in contamination concentration of at least about 99 percent and gradually decreases to about 70 percent as additional gases to be scrubbed 44 are introduced to the housing through the inlet without refilling or replacing the lean liquid.

Scrubbed gas, as the term is used herein refers to gas which has not only passed through the scrubber, but targeted contaminates have been removed and the resulting scrubbed gas meets or exceed EPA or state standards for "clean air" including but not limited to Title 40 for the EPA and the Texas Administrative Code Title 30, Chapter 106 subpart k, part 263 as well as Chapter 115, subpart d, divisional 1, and Chapters 311-319, which state no more than 20 ppm or 90 percent "removal efficiency" that is 90 percent of the contaminates provide "clean air". Other regulations provide a higher contamination concentration as their definition of "clean air."

In an embodiment, the contamination concentration can be from about 562,000 ppm to about 100 ppm for the gases to be scrubbed.

The scrubbed gas 12 can exit the reaction chamber 20 through the gas exit port 7 into the exit conduit 8.

The knock out canister 36 can serve to knock out, remove, or capture any of the liquid that can be entrained in the scrubbed gas 12.

FIG. 7A depicts a partial cut view of the housing 19 revealing the sintered permeable membrane 5. FIG. 7B depicts a detailed view of the partial cut view of the housing 19.

Referring to FIGS. 7A and 7B, the sintered permeable membrane 5 can have pores of identical diameters, such as all being about 50 micron diameters. The pores 48a, 48b, and 48c can have pore diameters 50a, 50b, and 50c.

The sintered material of the sintered permeable membrane can have void spaces equivalent to about 40 percent to about 50 percent of the sintered permeable membrane, that is the material making up the membrane can have open spaces that are from about 40 percent to about 50 percent. The sintered material of the sintered permeable membrane can have both internal pores and external pores.

In an embodiment, the void spaces can be greater than 50 percent or less than 40 percent depending upon the sintered material used. For example, if the sintered material used is carbon aerogel, it can have a void fraction of about >680 percent.

The sintered permeable membrane can be from about 1/32 of an inch thick to about 24 inches thick.

The sintered permeable membrane can be held in place inside the reaction chamber by pad grids 100a and 100b.

The sintered permeable membrane can comprise a member of the group consisting of: ceramic, carbon steel, other steel alloys, copper, copper alloys, carbide gel, other carbide materials, carbide films, polyamides, tungsten, polypropylene, carbon aerogels, ferrite magnets, silicon, polyethylene, polybutylene, homopolymers and copolymers thereof, acetates, glass, silica, and combinations of these materials.

FIG. 8 shows that the scrubbers can be connected in parallel so that several streams can be treated simultaneously. One or more lines, such as lines 800a, 800b, 800c, and 800d can be connected to the source 1. The lines 800a, 800b, 800c, and 800d can be in fluid communication with independent scrubbers.

Figure 9:
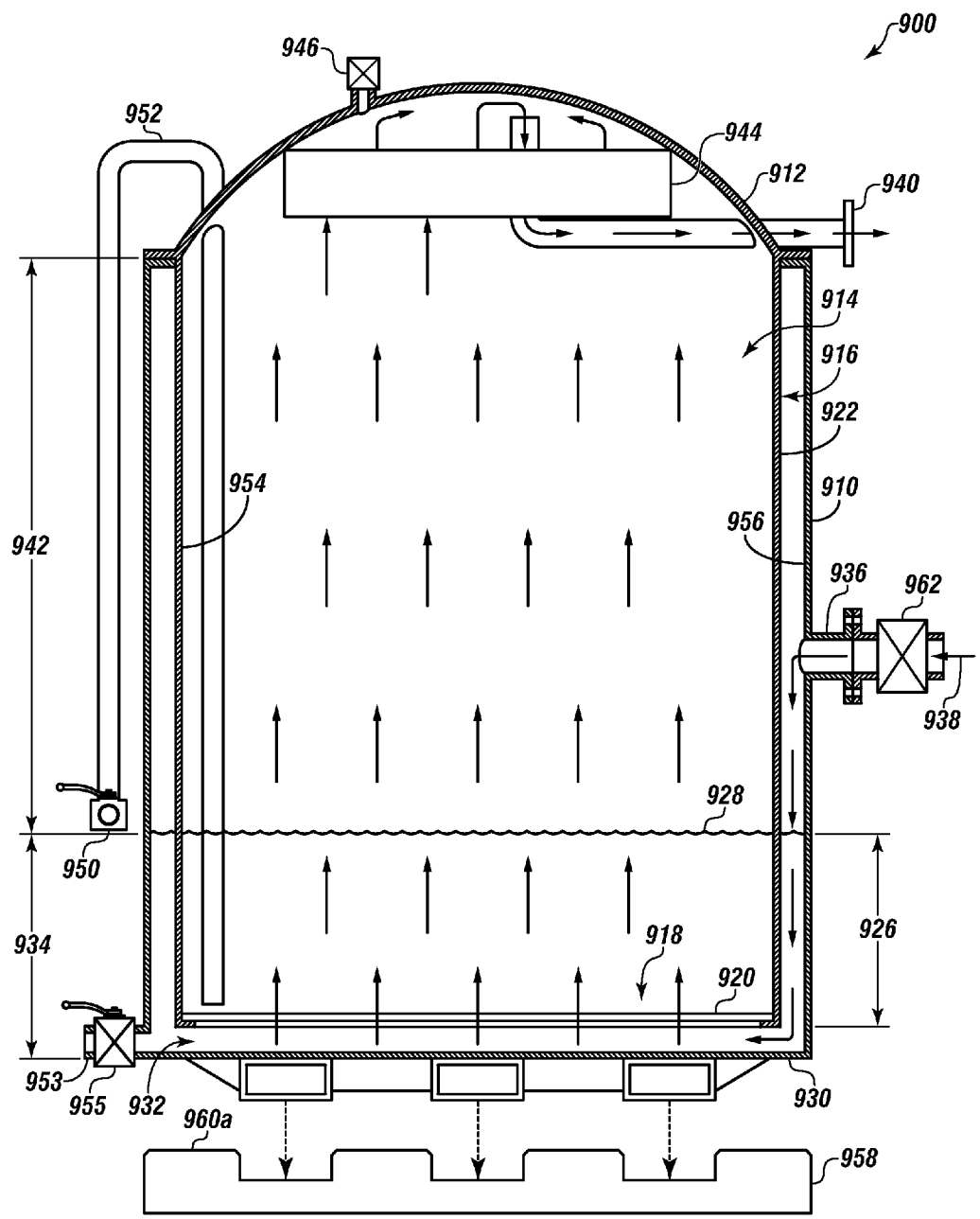
FIG. 9 is a schematic drawing of an apparatus according to one or more embodiments.

FIG. 9 is a schematic drawing of a scrubber according to one or more embodiments. The scrubber 900 can include a housing 910. The housing 910 can include at least one removable portion 912.

A reaction chamber 914 can be formed within the housing 910. A cartridge 916 can be disposed in the reaction chamber 914.

The cartridge 916 can include a gas transmitting floor 918. The gas transmitting floor 918 can include a sintered permeable membrane 920. The sintered permeable membrane 920 can include a plurality of pores.

One or more non-gas transmitting portions, such as non-gas transmitting portion 922, can be connected with the gas transmitting floor 918. The non-gas transmitting portion 922 can be connected to the removable portion 912. A space 932 can be formed between a first portion of the housing 930 and the gas transmitting floor 918.

At least portion of a first cartridge portion 926, the reaction chamber 914, and the space 932 can contain a lean liquid 928. At least a portion of the lean liquid 928 located within the space 932, the reaction chamber 914, and the first cartridge portion 926 can form a reaction zone 934.

An inlet 936 can be formed through the housing 910. The inlet 936 can be in fluid communication with the space 932. The inlet 936 can provide pressurized contaminated gas 938 to the space 932.

A gas exit port 940 can be in fluid communication with a second cartridge portion 942 and at least a portion of the reaction chamber 914. The gas exit port 940 can be connected with a demister pad 944.

A pressure relief valve 946 can be disposed in the housing 910. The pressure relief valve 946 can be any pressure relief valve and can be configured to release pressure from within the housing 910 if a predetermined pressure is reached within the housing 910.

A drain valve 950 can be connected with a drain port 952 formed through the housing 910. The drain valve 950 can control the flow rate of fluid through the drain port 952.

A liner 954 can be disposed on an inner surface of the cartridge 916. A housing liner 956 can be disposed on at least a portion of an inner portion of the housing 910.

A base 958 can be operatively connected with the housing 910, such as to the bottom of the housing 910. The base 958 can include a plurality of support members 960. The plurality of support members 960 can be connected with the housing 910.

An inlet check valve 962 can be connected with the inlet 936. The inlet check valve 962 can be configured to prevent back flow from the interior of the housing 910. The inlet check valve 962 can be a swinging check valve, a ball check valve, or another check valve.

An additional drain port 953 can be in fluid communication with the space 932. A drain port valve 955 can control flow of fluid through the additional drain port 953.

Figure 10:
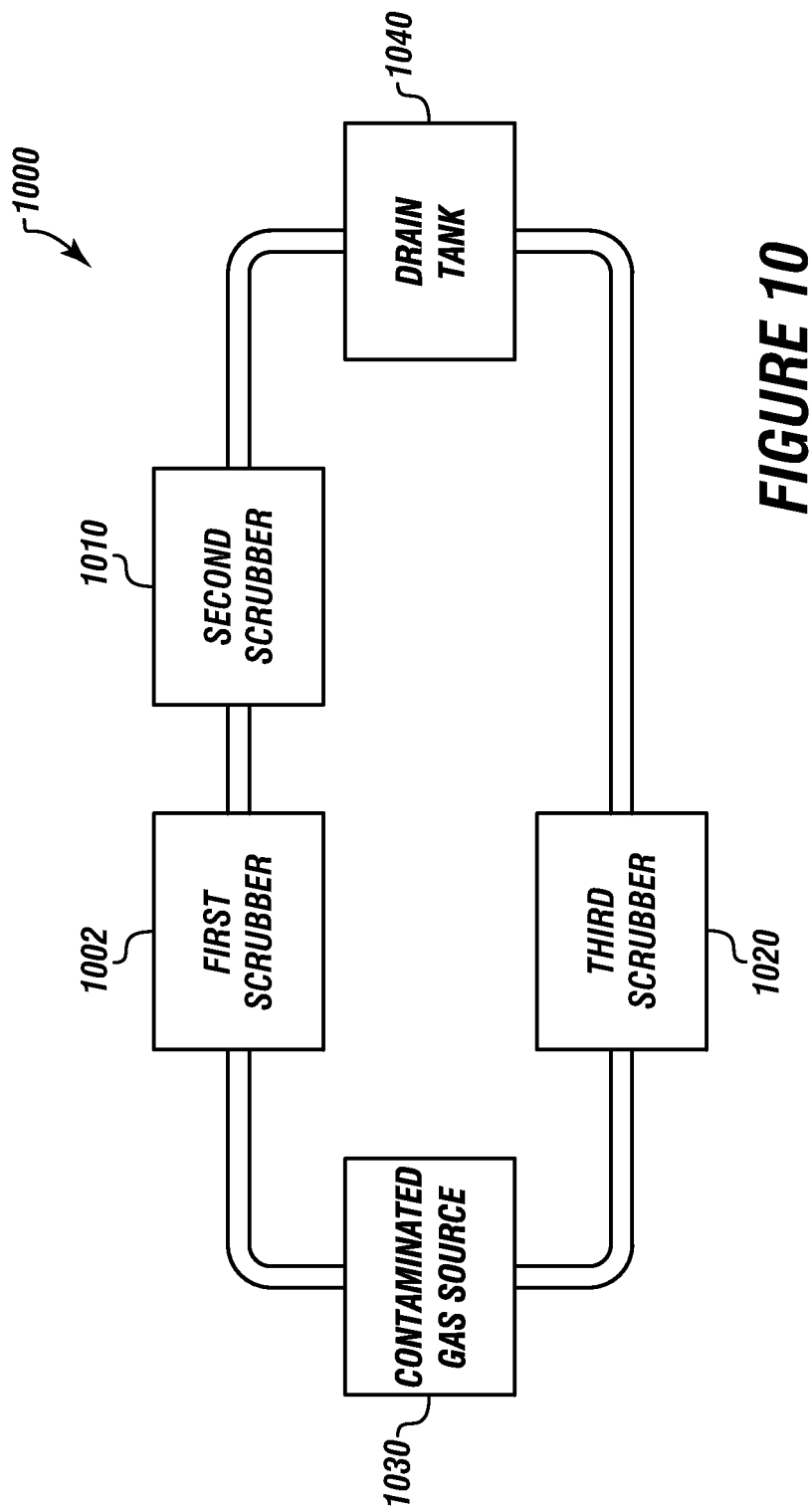
FIG. 10 depicts a plurality of apparatuses integrated into a system according to one or more embodiments.

FIG. 10 depicts a plurality of scrubbers integrated into a system according to one or more embodiments.

The system for removing unwanted contaminates from gases 1000 can include a first scrubber 1002 connected to a contaminated gas source 1030. The first scrubber 1002 can be connected in series to a second scrubber 1010.

A third scrubber 1020 can be connected to the contaminated gas source 1030, and can be in parallel to the scrubbers 1002 and 1010. The scrubbers 1002, 1010, and 1020 can be substantially similar to the scrubbers described herein.

A drain tank 1040 can be in fluid communication with the scrubbers 1002, 1010, and 1020.

Figure 11:
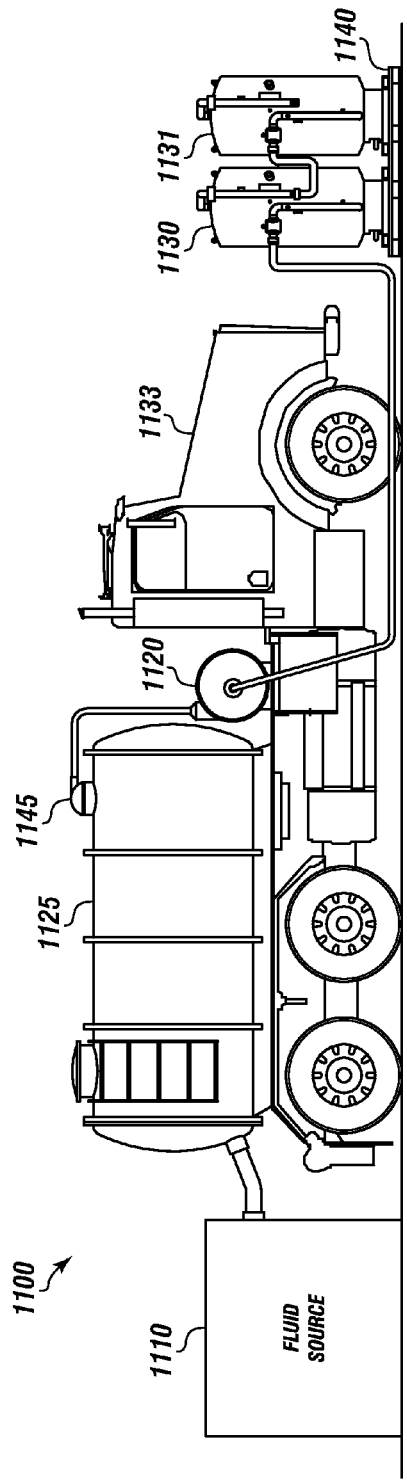
FIG. 11 depicts a schematic of another system for removing vapors from a liquid tank as the liquid tank is filled with fluid from a fluid source.

FIG. 11 depicts a schematic of another system for removing vapors from a liquid tank as the liquid tank is filled with fluid from a fluid source.

The system 1100 can include a fluid source 1110. The fluid source 1110 can be in fluid communication with a pump 1120. The pump 1120 can be in fluid communication with the liquid tank 1125 disposed on the transport vehicle 1133.

The scrubbers 1130 and 1131, which can be similar to one or more embodiments of the scrubbers described herein, can be in fluid communication with a vent 1145 and can be disposed on the transport device 1140.

Figure 12:
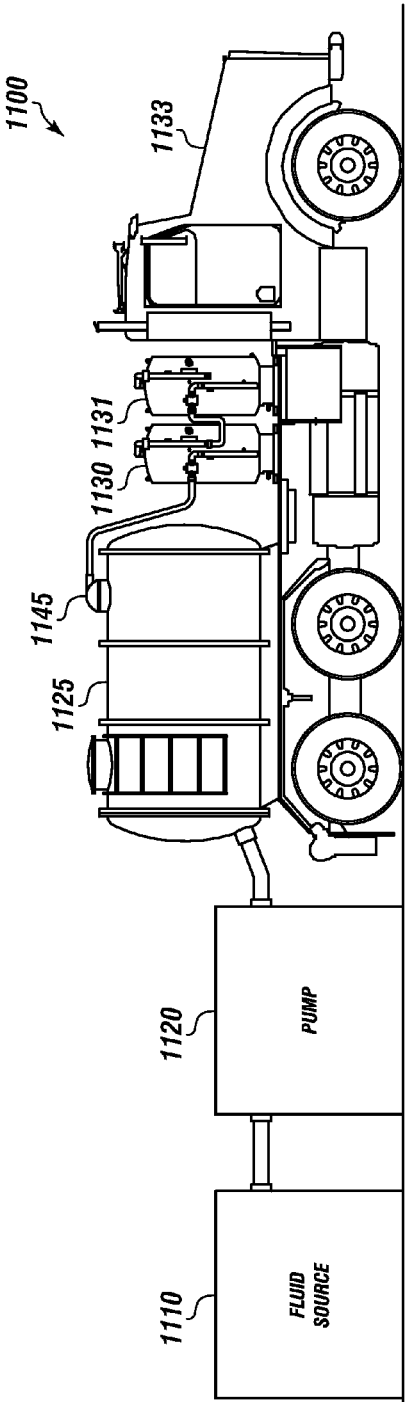
FIG. 12 depicts a schematic of a system for removing vapors from a liquid tank as the liquid tank is filled with fluid from a fluid source.

FIG. 12 depicts a schematic of a system for removing vapors from a liquid tank as the liquid tank is filled with fluid from a fluid source.

The system 1100 can include a fluid source 1110. The fluid source 1110 can be in fluid communication with a pump 1120. The pump 1120 can be in fluid communication with a liquid tank 1125 disposed on a transport vehicle 1133.

Mobile scrubbers 1130 and 1131, which can be similar to one or more embodiments of the scrubbers described herein, can be in fluid communication with a vent 1145 of the liquid tank 1125.

FIG. 13 depicts a system 1300 utilizing a housing having a liquid tank portion 1303 and a scrubber portion 1302. The scrubber portion 1302 can be in fluid communication with a vent 1350 that is in fluid communication with the liquid tank portion 1303. The liquid tank portion 1303 can be in fluid communication with the pump 1120. The pump 1120 can be in fluid communication with the fluid source 1110.

FIG. 14 depicts another embodiment of another system for removing vapors from a liquid tank as the liquid tank is filled with fluid from a fluid source. The system 1400 can include a housing having a liquid tank portion 1303 and a scrubber portion 1302. A pump 1402 can be in fluid communication with an inlet to the liquid tank portion 1303 and the vent 1350. The liquid tank portion 1303 can be in fluid communication with the fluid source 1110.

Figure 15:
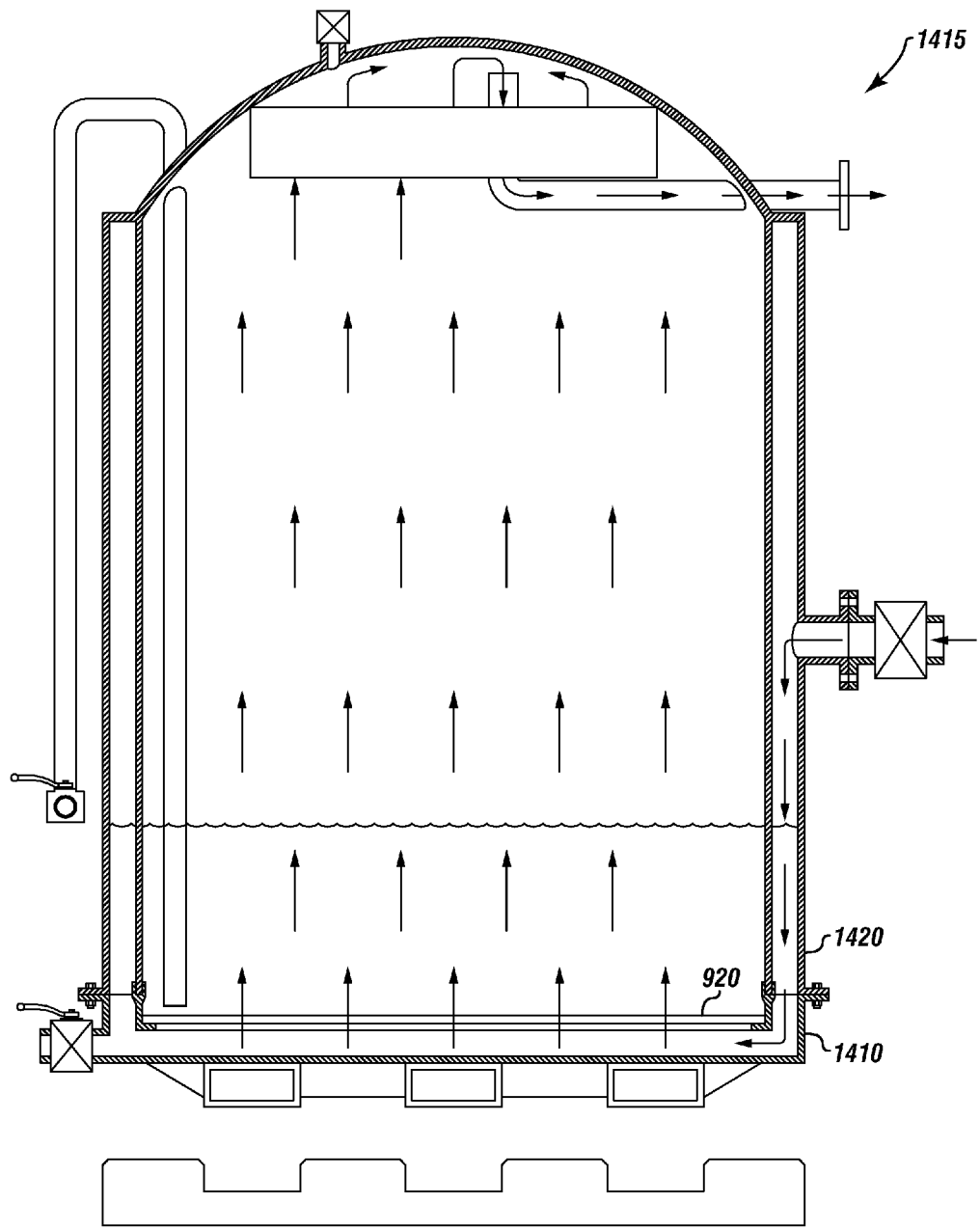
FIG. 15 depicts another embodiment of the apparatus for removing vapors from a liquid tank as the liquid tank is filled with fluid from a fluid source.

FIG. 15 depicts another embodiment of the apparatus for removing vapors from a liquid tank as the liquid tank is filled with fluid from a fluid source. Certain portions of the scrubber 1415 that have been described above have not been called out for clarity purposes. The scrubber 1415 can include an upper housing portion 1420 that is selectively attachable with a lower housing portion 1410. The lower housing portion 1410 can have the sintered permeable membrane 920 connected therewith. The scrubber 1415 can be configured to exhaust scrubbed gases and receive contaminated gases.

While these embodiments have been described with emphasis on the embodiments, it should be understood that within the scope of the appended claims, the embodiments might be practiced other than as specifically described herein.

What is claimed is:

1. A system for removing vapors from a liquid tank as the liquid tank is filled with fluid from a fluid source, wherein the system comprises:
   a. a transport vehicle;
   b. a liquid tank connected with the transport vehicle, wherein the liquid tank comprises at least one vent; and
   c. a scrubber in fluid communication with the at least one vent of the liquid tank, wherein the scrubber comprises a sintered permeable membrane disposed in a reaction zone within a housing, wherein the housing comprises a lean liquid, wherein the sintered permeable membrane is configured to contact vapor from the liquid tank, wherein the vapor has been in prior contact with the lean liquid in a portion of a reaction chamber, and wherein the sintered permeable membrane provides an interface for enhanced contact of gases to be scrubbed and an interface for the lean liquid.

2. The system of claim 1, further comprising a pump connected with the at least one vent and wherein an exhaust of the pump is connected with the scrubber.

3. The system of claim 1, wherein the housing comprises a removable portion.

4. The system of claim 3, wherein the sintered permeable membrane is integrated with a cartridge, and wherein a portion of the cartridge is connected to the removable portion of the housing.

5. The system of claim 1, wherein the scrubber is disposed on a transport device.

6. The system of claim 5, wherein the transport device is a skid, a trailer, a pallet, or combinations thereof.

7. The system of claim 1, wherein the scrubber is connected with the transport vehicle.

8. The system of claim 1, wherein the scrubber and the liquid tank are disposed on a single transport device.

9. The system of claim 1, wherein the scrubber and the liquid tank are disposed on the transport vehicle.

10. The system of claim 1, further comprising a plurality of scrubbers each in fluid communication with at least one vent of the liquid tank.

11. The system of claim 1, wherein the transport vehicle is a barge, a trailer, a barge with a trailer disposed on the barge, a truck, a ship, a rail car with a trailer disposed thereon, a skid, or combinations thereof.

12. A system for removing vapors from a liquid tank as the liquid tank is filled with fluid from a fluid source, wherein the system comprises:
    a. a transport vehicle; and
    b. a housing comprising a liquid tank portion and a scrubber portion, wherein the liquid tank portion has at least one vent in fluid communication with the scrubber portion, and wherein the scrubber portion comprises a sintered permeable membrane disposed in a reaction zone within a housing, wherein the housing comprises a lean liquid, wherein the sintered permeable membrane is configured to contact vapor from the liquid tank, wherein the vapor has been in prior contact with the lean liquid in a portion of a reaction chamber, and wherein the sintered permeable membrane provides an interface for enhanced contact of gases to be scrubbed and an interface for the lean liquid.

13. The system of claim 12, further comprising a pump connected with the at least one vent and wherein an exhaust of the pump is connected with the scrubber portion.

14. The system of claim 12, wherein the housing comprises a removable portion.

15. The system of claim 14, wherein the sintered permeable membrane is integrated with a cartridge, and wherein a portion of the cartridge is connected to the removable portion of the housing.

16. The system of claim 12, wherein the housing is disposed on a transport device.

17. The system of claim 16, wherein the transport device is a skid, a trailer, a pallet, or combinations thereof.

18. The system of claim 12, further comprising a plurality of housings wherein at least one of the housings comprises a liquid tank portion and a scrubber portion connected with the transport vehicle.

19. The system of claim 12, wherein the transport vehicle is a barge, a trailer, a barge with a trailer disposed on the barge, a truck, a ship, a rail car with a trailer disposed thereon, a skid, or combinations thereof.

* * * * *